United States Patent
Veit et al.

[11] 3,875,957
[45] Apr. 8, 1975

[54] OXYGEN-AIR DILUTER DEVICE

[75] Inventors: Herbert F. Veit, Fullerton; Robert M. Hamilton, Brea, both of Calif.

[73] Assignee: Robertshaw Controls Company, Richmond, Va.

[22] Filed: Sept. 19, 1972

[21] Appl. No.: 290,426

[52] U.S. Cl. ......... 137/81; 128/142.2; 137/DIG. 9; 137/491; 137/495; 251/29
[51] Int. Cl. ............................................. A62b 9/02
[58] Field of Search ........ 137/DIG. 9, 81, 491, 495; 128/142, 142.2, 145.8; 251/29

[56] References Cited
UNITED STATES PATENTS
3,474,812 10/1969 Robertson ............................ 137/81
3,509,895 5/1970 Henneman ........................... 137/81
FOREIGN PATENTS OR APPLICATIONS
885,353 12/1961 United Kingdom .................. 137/81

*Primary Examiner*—Alex Cohan
*Assistant Examiner*—Richard Gerard
*Attorney, Agent, or Firm*—Anthony A. O'Brien

[57] ABSTRACT

An oxygen-air diluter device having three operational modes, namely, normal dilution, 100 percent oxygen and pressure breathing, includes a chamber divided by a differential pressure operated diaphragm into an outlet pressure sensing portion and an operating pressure sensing portion. A main oxygen supply valve is responsive to movement of the diaphragm and movable between oxygen regulating positions. Valve means control feed of operating pressure to the chamber and connection of the chamber to exhaust. The valve means are actuated by manual means and automatic means in response to ambient pressure and oxygen supply pressure actuatable regardless of altitude.

8 Claims, 3 Drawing Figures

3,875,957

OXYGEN-AIR DILUTER DEVICE

FIELD OF THE INVENTION

The present invention relates to breathing apparatus and, in particular, to an oxygen-air diluter of the demand type utilized in high altitude and space flights.

SUMMARY OF THE INVENTION

The present invention is summarized in that an oxygen-air diluter device for breathing apparatus includes a casing having an oxygen inlet adapted to be connected to an oxygen source, an ambient air inlet and an outlet adapted to be connected to breathing apparatus, first and second conduit means in the casing connecting the oxygen inlet and the ambient air inlet, respectively, to the outlet, chamber means in the casing, a differential pressure operated diaphragm in the chamber means separating the same into a first chamber sensing outlet pressure and a second chamber sensing an operating pressure, oxygen regulating means in the first conduit having main valve means responsive to movement of the diaphragm and being movable between oxygen-regulating positions, and means disposed in the casing and controlling the operating pressure in the second chamber to affect operation of the differential pressure operated diaphragm.

It is, therefore, an object of the present invention to control air flow with an oxygen-air diluter in three modes of operation to provide normal air dilution, 100 percent oxygen, and pressure breathing.

It is also an object of the present invention to control an oxygen regulating means in response to movement of a differential pressure operated diaphragm in a chamber by application of a demand pressure to one side of the diaphragm and selective application of an operating pressure to the other side of the diaphragm.

It is a further object of the present invention to control air flow in an oxygen-air diluter in accordance with ambient pressure, oxygen supply pressure and demand.

Other objects and advantages of the present invention will become apparent from the following description taken in conjunction with the accompanying drawings.

DESCRIPTION OF THE PREFERRED EMBODIMENT

Figure 1:
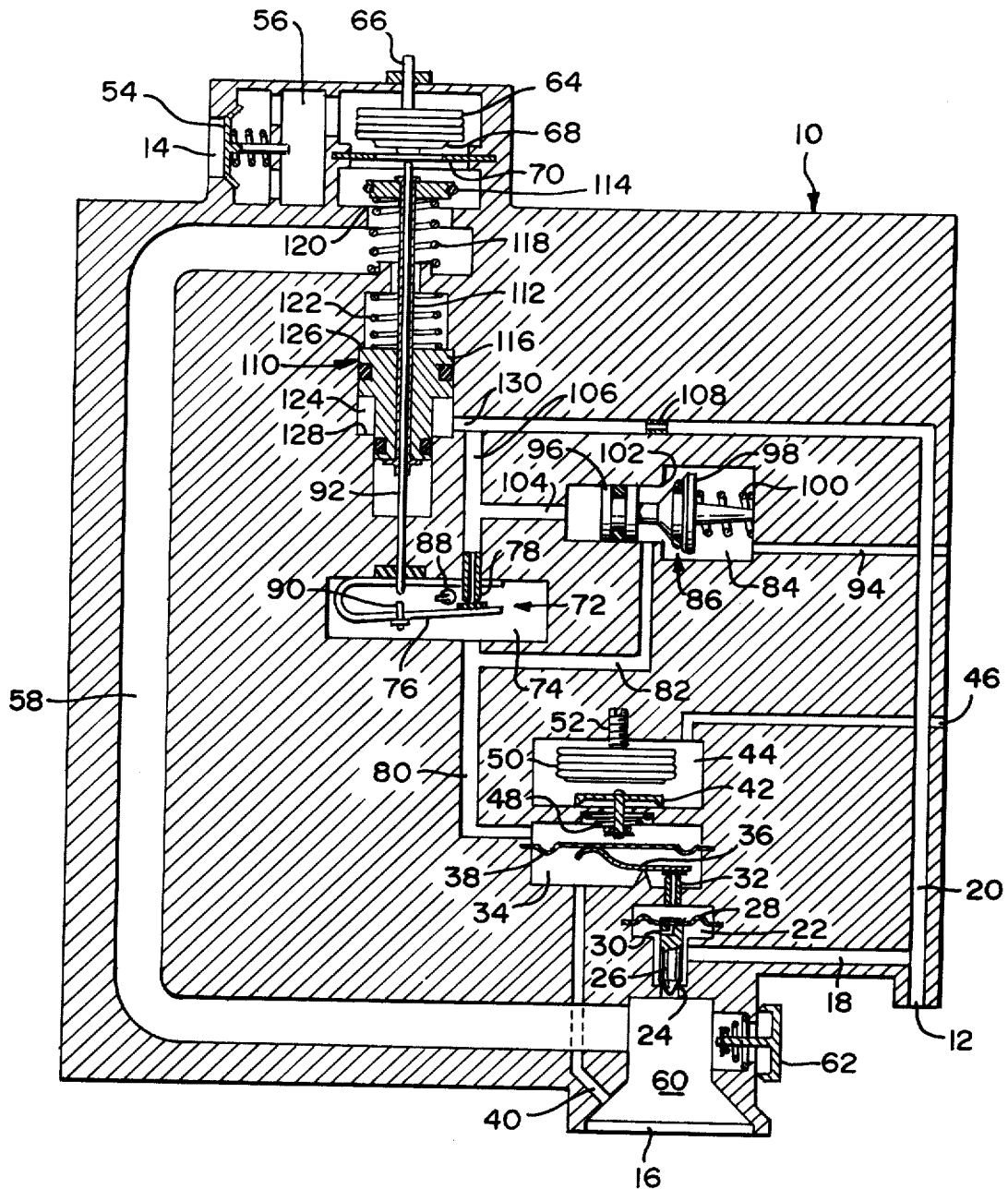
FIG. 1 is a cross-section of a breathing control device embodying the present invention with the elements shown in a dilute mode position.

The present invention is embodied in a breathing control device in the form of a casing, indicated generally at 10, having an oxygen inlet 12 adapted to be connected to a source of oxygen (not shown), an ambient air inlet 14 and an air outlet 16 adapted to be connected to a breathing device (also not shown) such as a face mask, helmet or the like. The oxygen inlet 12 connects with first and second conduits 18, 20, respectively. Conduit 18 communicates with an oxygen inlet chamber 22 one end of which forms a main valve seat 24 aligned with the outlet 16. Main valve member 26 cooperates with the valve seat 24 and has a stem portion attached to a flexible diaphragm 28 closing the opposite end of inlet chamber 22.

A small bleed passage 30 in valve member 26 establishes communication between the opening or inlet side and the slightly larger closing side of the main valve. A pilot orifice 32 provides communication between the closing side of the main valve and a sensing chamber 34. The pilot orifice is controlled by one end of a paddle assembly 36 pivotally mounted intermediate its ends to a wall of the sensing chamber 34. A flexible sensing diaphragm 38 divides the sensing chamber into sensing and reference pressure portions with the former communicating with the outlet 16 by sensing conduit 40.

An emergency and programming pressure valve 42 is positioned to open in response to pressure in the reference pressure portion of sensing chamber 34 to place said reference pressure portion in communication with ambient atmosphere through atmospheric chamber 44 and conduit 46. Spring 48 normally biases pressure valve 42 closed. An oxygen altitude programmming aneroid 50 is mounted in atmospheric chamber 44 by adjustment screw 52 to oppose opening of pressure valve 42 as the aneroid expands with increased altitude.

An air inlet check valve 54 is spring biased to normally close ambient air inlet 14 leading to air flow chamber 56. Air flow chamber 56 communicates through air conduit 58 with mixing chamber 60. The main valve seat 24 and outlet 16 open into opposite walls of mixing chamber 60 while another wall is provided with an over pressure relief valve 62.

An aneroid bellows 64 is adjustably mounted at one end to one wall of air flow chamber 56 by adjustment screw 66. The opposite end of the bellows 64 is formed as a valve member 68 which cooperates with valve seat 70 fixed in air flow chamber 56.

A mode selector valve 72 is positioned in mode chamber 74 and includes valve arm member 76 cooperating with pilot orifice 78. Mode chamber 74 communicates with the reference pressure portion of sensing chamber 34 through conduit 80 and through conduit 82 to reference pressure chamber 84 housing reference pressure selector valve 86. The mode selector valve 72 is manually actuatable by lever means 88, only a cam portion of which has been shown. A pin 90 on the valve arm member 76 is positioned in opposition to mode selector actuating rod 92.

Reference pressure chamber 84 communicates with atmosphere through conduit 94. The reference pressure selector valve 86 includes a piston portion 96 and a valve body portion 98 biased by spring 100 against valve seat 102. The piston portion of reference pressure chamber 84 communicates with oxygen inlet 12 through conduits 104, 106 and restriction 108. The conduit 106 also connects with pilot orifice 78.

An air inlet control valve assembly 110 includes a flanged sleeve 112 mounted on actuating rod 92 with air inlet control valve 114 and oxygen depletion air valve actuator 116 mounted on opposite ends of the sleeve 112. Air valve opening spring 118 biases the air inlet control valve 114 away from the air valve seat 120 while air valve closure spring 122 acts against actuator 116, which moves in chamber 124 between stops 126, 128, to close the air valve 114. The chamber includes orifice 130 opening to conduit 20.

It should be noted that in the following description of the sequence of operation of the present invention, the flow of oxygen is controlled by demand and is thus varied with inhalation and exhalation of the user. The flow of oxygen is zero at the start of inhalation, rises to a controlled maximum during inhalation, and decreases to zero and remains at zero during exhalation. The proportion of oxygen to ambient air during the breathing cycle will depend upon both altitude and the selected mode.

FIG. 1 shows the relative positions of the elements for the dilute mode operation of the device with no demand for air. The oxygen regulator portion of the unit controls oxygen flow from the oxygen inlet 12 to the outlet 16 by the main valve 24, 26. There is a slight area differential to the main valve body 26, as mentioned above, with the closing side area being slightly larger than the opening side area. Paddle assembly 36 closes the pilot orifice 32 until there is a demand for air flow. Thus, with no demand for air, the closing side of the main valve 26 is exposed to full oxygen inlet pressure and, because of the area unbalance in the closing direction, remains closed.

Any demand for air flow is transferred through the sensing conduit 40 to the sensing chamber 34 resulting in a pressure which is slightly less than the pressure in the reference portion of chamber 34. This pressure differential causes the sensing diaphragm 38 to move in a direction that loads the paddle assembly 36 and causes the pilot orifice 32 to open in proportion to the sensed demand. Opening of the pilot orifice 32 permits the pressure on the closing side of the main valve 26 to decay faster than it can be replenished through the bleed passage 30. The oxygen pressure on the inlet side of the main valve 26 remains constant causing a force unbalance to occur across the main valve which opens to permit oxygen flow through mixing chamber 60 and outlet 16 until the pressure in the sensing portion of chamber 34 is equal to or greater than the reference pressure. When this occurs, the loading of the sensing diaphragm 38 is removed from the paddle assembly 36 permitting it to close the pilot orifice 32. Pressure on the closure side of the main valve 26 then increases to the oxygen inlet pressure level, and the area unbalance causes the main valve 26 to close.

The relief valve 62 prevents overpressurization of the breathing apparatus by limiting the output pressure in mixing chamber 60 to a pressure which is slightly higher than the maximum pressure that occurs during pressure breathing.

The regulator portion of the unit functions similarly for the dilute, the manual 100 percent oxygen and the automatic pressure breathing modes of operation. The regulator portion of the device is shown only in FIG. 1 and will not be described again in connection with the other modes of operation.

Figure 3:
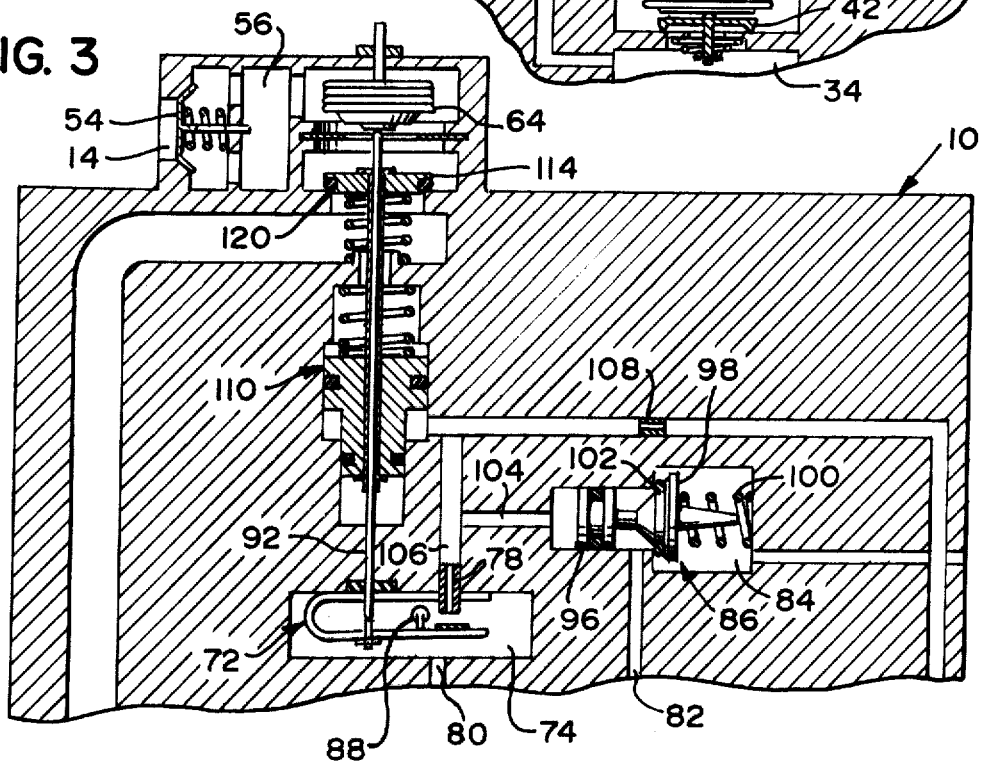
FIG. 3 is a fragmentary cross-section of the device of FIG. 1 with the elements shown in a 100 percent oxygen mode position.

The selection between the dilute and 100 percent oxygen modes of operation is controlled by the positioning of the manual mode lever 88. This lever has two positions, namely, a dilute position (FIG. 1) and a 100 percent oxygen position (FIG. 3). Assuming the conditions illustrated in FIG. 1, with the lever 88 in the dilute position and the device at low altitude, the mode selector valve 72 is closed sealing off the flow of oxygen, which has been metered through restrictor 108, through pilot orifice 78. This metered oxygen flows through orifice 130 to chamber 124 and causes the oxygen depletion air valve actuator 116 to move against air valve closure spring 122 to a position that releases the air inlet valve 114 and the air valve opening spring 118 causes the air inlet valve 114 to move to an open position. The air inlet valve 114 remains in the open position as long as there is sufficient pressure to maintain the oxygen depletion air valve actuator 116 in a position where it overpowers the air valve closing spring 122. The oxygen metered through restrictor 108 simultaneously moves and then retains the reference pressure selector valve 86 to a position that vents the reference side of the regulator sensing diaphragm 38 to ambient atmosphere, via conduits 80, 82, chamber 84 and conduit 94, thus permitting the regulator to perform as a demand type unit.

Upon a demand for air, ambient air enters the unit through air inlet check valve 54. Since nothing impedes the flow of ambient air at this time, there will only be a slight pressure drop sensed through conduit 40 to allow a small oxygen flow through the main valve. The air flow through the air inlet control valve 114 is monitored according to altitude by the air programming aneroid 64. As the altitude increases, the aneroid 64 expands until valve member 68 engages valve seat 70 to progressively throttle and finally close off ambient air flow.

Figure 2:
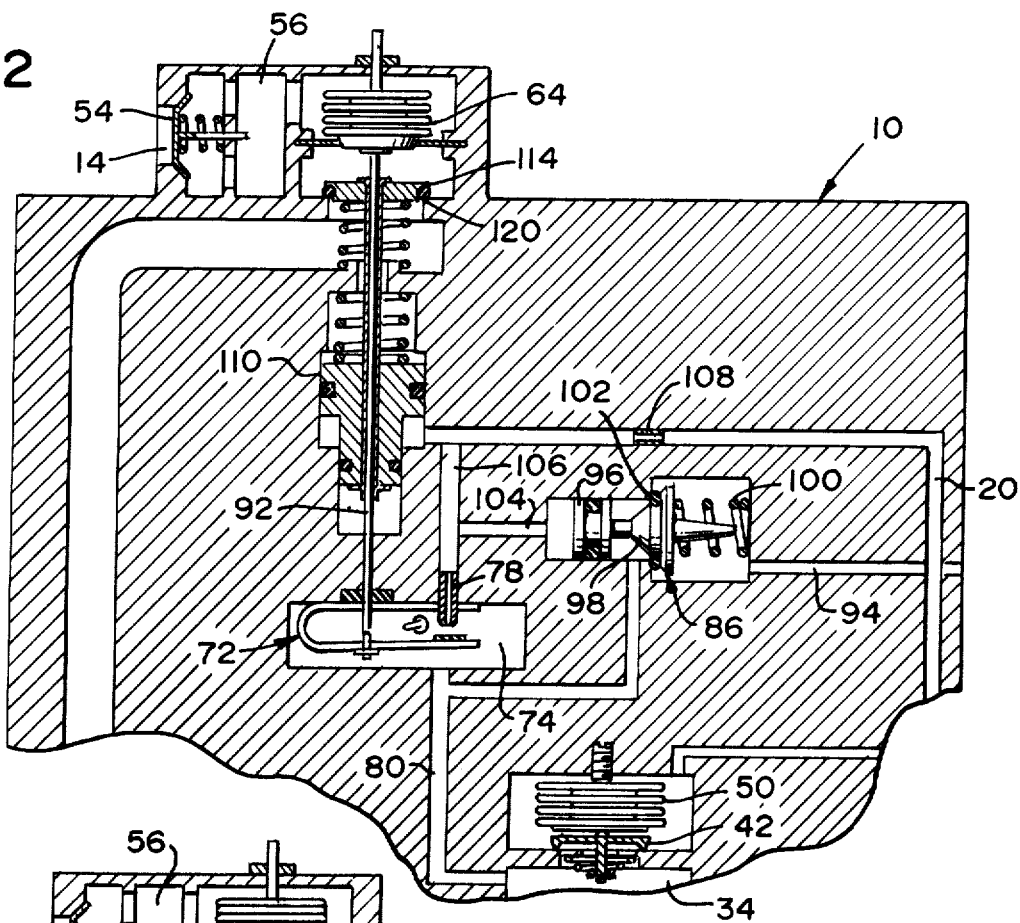
FIG. 2 is a fragmentary cross-section of the device of FIG. 1 with the elements shown in an automatic pressure breathing position.

At a prescribed altitude, set by adjustment screw 66, the aneroid 64 closes off the ambient air flow and automatically programs the regulator demand unit to an automatic pressure breathing regulator in the following manner (see FIG. 2). The aneroid 64 expands to engage mode selector actuating rod 92 and opens the mode selector valve 72. This permits the metered oxygen pressure between the restrictor 108 and pilot orifice 78 to decay rapidly because the restrictor flow capacity is considerably less than the pilot orifice capacity. This pressure reduction permits the selector valve spring 100 to actuate the reference pressure selector valve 86 in a direction such that valve body portion 98 engages valve seat 102 to close off communication between conduits 82 and 94. Oxygen flows through the restrictor 108, pilot orifice 78, chamber 74 and conduit 80 to fill the reference portion of the sensing chamber 34. This reference pressure is maintained by the emergency and programming valve 42 at a slightly positive reference pressure since oxygen altitude programming aneroid 50 has also expanded with altitude and loads valve 42. Any overpressure in this mode would overcome spring 100 causing reference pressure selector valve 86 to open and vent the overpressure to atmosphere through conduit 94. As the air inlet control valve 114 progressively throttles the flow of ambient air, a greater pressure drop will be sensed at sensing conduit 40 thus causing the progressive further opening of the main valve with the attendent greater oxygen flow. Thus the regulator is automatically converted from a demand type unit, having air dilution capabilities, to a 100 percent oxygen regulator, with the output at positive pressure and with the ambient air inlet closed.

The manual mode selection lever may be placed in the 100 percent oxygen mode at any altitude (see FIG. 3). The regulator system functions in a similar manner to a unit that has been automatically converted to a 100 percent oxygen mode, as described above with reference to FIG. 2, by manual opening of the mode selector valve 72. The primary difference between these two modes is the aneroids 50 and 64 do not have any effect in the 100 percent oxygen mode. The unit may be returned to the dilute mode at anytime by moving the selector lever 88 to the dilute setting, provided that the unit is at an altitude lower than the automatic cut-in-point of the mode selector valve 72.

From the foregoing it can be seen that the present regulator is intended for use as a multiple purpose breathing regulator. The manual selector lever 88 permits use of the regulator in either of two modes, a dilute mode which proportions the mixture of oxygen and ambient air in accordance with the altitude encountered and a 100 percent oxygen mode which feeds oxygen only regardless of altitude. In the dilute mode, the regulator is a demand type unit which requires a slight suction at the outlet to induce air flow through the unit. Removal of demand permits the regulator to lock-up so that the oxygen supply is not wasted. In the 100 percent oxygen mode, the air diluting system is closed and a positive pressure of oxygen is produced. The oxygen remains at a positive pressure during all flows and at lock-up conditions.

Even with the manual selector lever 88 in the dilute position, the regulator will automatically convert to the 100 percent oxygen mode when a predetermined altitude is reached, as determined by aneroid 64, and will remain in this mode as long as this predetermined altitude is exceeded. As the altitude further increases, the regulator will automatically convert to a pressure breathing mode by aneroid 50 locking up valve 42. The altitude at which aneroid 50 becomes effective is generally considerably greater than the altitude at which aneroid 64 becomes effective.

The present regulator also includes an oxygen depletion feature which permits automatic closing of air control valve 114 when the selector lever 88 is in the dilute position and when the oxygen inlet supply has decayed to a predetermined minimum pressure. The decreased oxygen inlet pressure will be sensed in chamber 124. When the pressure acting on actuator 116 is no longer adequate to overcome closure spring 122, the air inlet control valve will be closed by spring 122. Thus the ambient air supply will be cut off. The user can sense this condition by the increased suction required to draw in an adequate air supply.

Inasmuch as the preferred embodiment of the present invention is subject to many modifications, variations and changes in details, it is intended that all matter contained in the foregoing description or shown in the accompanying drawings shall be interpreted as illustrative and not in a limiting sense.

What is claimed is:

1. An oxygen-air diluter device for breathing apparatus comprising:
    a casing having an oxygen inlet adapted to be connected to an oxygen source, an ambient air inlet, and an outlet adapted to be connected to the breathing apparatus,
    first and second conduit means in said casing connecting said oxygen inlet and said ambient air inlet, respectively, to said outlet,
    chamber means in said casing,
    a differential pressure operated diaphragm in said chamber means separating the same into a first chamber sensing outlet pressure and a second chamber sensing an operating pressure,
    oxygen regulating means in said first conduit including main valve means responsive to movement of said diaphragm and movable between oxygen regulating positions, and
    means disposed in said casing and controlling the operating pressure in said second chamber to affect operation of said differential pressure operated diaphragm including third conduit means connecting said oxygen inlet with said second chamber, first valve means in said third conduit means for controlling flow from said oxygen inlet to said second chamber, fourth conduit means connecting said second chamber with the atmosphere and second valve means in said fourth conduit means responsive to said first valve means to open and vent said second chamber to the atmosphere when said first valve means is closed and to close when said first valve means is open.

2. The oxygen-air diluter device according to claim 1 further comprising manual means for selectively opening said first valve means and automatic means responsive to ambient pressure for opening said first valve means.

3. The oxygen-air diluter device according to claim 2 wherein said automatic means includes aneroid means for progressively opening said first valve means with decreasing ambient pressure.

4. The oxygen-air diluter device according to claim 1 further comprising ambient valve means for controlling flow of ambient air through said ambient air inlet, said ambient valve means being responsive to both ambient and operating pressure.

5. The oxygen-air diluter device according to claim 4 further comprising aneroid means for progressively closing said ambient valve means with decreasing ambient pressure.

6. An oxygen-air diluter device for breathing apparatus comprising:
    a casing having an oxygen inlet adapted to be connected to an oxygen source, an ambient air inlet, and an outlet adapted to be connected to the breathing apparatus,
    first and second conduit means in said casing connecting said oxygen inlet and said ambient air inlet, respectively, to said outlet,
    chamber means in said casing,
    a differential pressure operated diaphragm in said chamber means separating the same into a first chamber sensing outlet pressure and a second chamber sensing an operating pressure,
    oxygen regulating means in said first conduit including main valve means responsive to movement of said diaphragm and movable between oxygen-regulating positions,
    means disposed in said casing and controlling the operating pressure in said second chamber to affect operation of said differential pressure operated diaphragm, said means controlling the operating pressure including third conduit means connecting said oxygen inlet with said second chamber, first valve means disposed in said third conduit means and operable to control communication between said second chamber and said oxygen inlet and second valve means responsive to said first valve means to vent said second chamber to atmosphere when said first valve means is closed.

ambient valve means responsive to ambient pressure and operating pressure for controlling flow of ambient air through said ambient air inlet, and piston means for closing said ambient valve means in response to a decrease in operating pressure to a predetermined level.

7. An oxygen-air diluter device for breathing apparatus comprising:

a casing having an oxygen inlet adapted to be connected to an oxygen source, an ambient air inlet, and an outlet adapted to be connected to the breathing apparatus, first and second conduit means in said casing connecting said oxygen inlet and said ambient air inlet, respectively, to said outlet, chamber means in said casing, a differential pressure operated diaphragm in said chamber means separating the same into a first chamber sensing outlet pressure and a second chamber sensing an operating pressure, oxygen regulating means in said first conduit including main valve means responsive to movement of said diaphragm and movable between oxygen-regulating positions, means disposed in said casing and controlling the operating pressure in said second chamber to affect operation of said differential pressure operated diaphragm, said means controlling the operating pressure including third conduit means connecting said oxygen inlet with said second chamber, first valve means disposed in said third conduit means and operable to control communication between said second chamber and said oxygen inlet and second valve means responsive to said first valve means to vent said second chamber to atmosphere when said first valve means is closed, ambient valve means responsive to ambient pressure and operating pressure for controlling flow of ambient air through said ambient air inlet, and means for opening said first valve means upon closure of said ambient valve means.

8. An oxygen-air diluter device for breathing apparatus comprising:

a casing having an oxygen inlet adapted to be connected to an oxygen source, an ambient air inlet, and an outlet adapted to be connected to the breathing apparatus, first and second conduit means in said casing connecting said oxygen inlet and said ambient air inlet, respectively, to said outlet, chamber means in said casing, a differential pressure operated diaphragm in said chamber means separating the same into a first chamber sensing outlet pressure and a second chamber sensing an operating pressure, oxygen regulating means in said first conduit including main valve means responsive to movement of said diaphragm and movable between oxygen-regulating positions, means disposed in said casing and controlling the operating pressure in said second chamber to affect operation of said differential pressure operated diaphragm, said means controlling the operating pressure including third conduit means connecting said oxygen inlet with said second chamber, first valve means disposed in said third conduit means and operable to control communication between said second chamber and said oxygen inlet and second valve means responsive to said first valve means to vent said second chamber to atmosphere when said first valve means is closed, check valve means responsive to operating pressure in said second chamber for exhausting said second chamber to atmosphere when the operating pressure exceeds a predetermined pressure, and aneroid means for progressively loading said check valve means against opening as ambient pressure decreases.

* * * * *